United States Patent [19]

Güggi et al.

[11] Patent Number: 4,830,305

[45] Date of Patent: May 16, 1989

[54] ROOM-LIGHT LOAD CASSETTE

[75] Inventors: Markus Güggi, Marly; Fernand Gervais, Giffers, both of Switzerland

[73] Assignee: Ciba-Geigy AG, Basel, Switzerland

[21] Appl. No.: 114,490

[22] Filed: Oct. 28, 1987

[30] Foreign Application Priority Data

Oct. 29, 1986 [CH] Switzerland ............... 4277/86

[51] Int. Cl.$^4$ .................................................. G03B 17/26
[52] U.S. Cl. .................................. 242/71.7; 206/409;
354/275; 242/55.53
[58] Field of Search .............. 242/71.7, 71.1, 55.53,
242/194; 206/316, 387, 397, 407, 408, 409;
354/275

[56] References Cited

U.S. PATENT DOCUMENTS

| | | | |
|---|---|---|---|
| 2,905,405 | 9/1959 | Burton et al. | 242/55.53 |
| 3,612,424 | 10/1971 | Friedel | 242/71.7 X |
| 3,613,876 | 10/1971 | Kohler et al. | 242/71.1 X |
| 3,613,880 | 10/1971 | Perrin | 242/55.53 X |
| 3,784,001 | 1/1974 | Bushnell et al. | 242/194 |
| 4,034,929 | 7/1977 | Ebner, Jr. | 242/71.1 |
| 4,272,035 | 6/1981 | Sherman et al. | 242/71.1 |
| 4,291,802 | 9/1981 | Buelens | 242/71.7 X |
| 4,403,845 | 9/1983 | Buelens et al. | 242/71.1 X |
| 4,597,658 | 7/1986 | Buelens et al. | 242/71.1 X |
| 4,671,409 | 6/1987 | Espy | 242/55.53 X |

FOREIGN PATENT DOCUMENTS 0016488 10/1980 European Pat. Off. .
0053856 6/1982 European Pat. Off. .

OTHER PUBLICATIONS

Research Disclosure, 4244, No. 16352 (11/77).

Primary Examiner—John M. Jillions
Attorney, Agent, or Firm—Harry Falber

[57] ABSTRACT

In a room-light load cassette, a web of photographic material is wound on a reel core, and the core is rotatably supported, by means of two core hubs, in hub seats provided in two opposite cassette end walls of a light-tight casing. Each of the hubs which are firmly mounted in the core, comprise a hollow sleeve part which is supported in the respective hub seat. In order to secure the web roll of photographic material in the cassette against unwinding during shipping and storage, a core lock comprising a locking member is provided in one of the end caps. The locking member bears an external gear and is connected via connecting means breakable at a desired rupturing zone, with the hub seat of the respective end cap. The teeth of the external locking member gear engage an internal gear in a sleeve part being part of the corresponding core hub, and prevent the core from rotating as long as the connecting means, preferably in the form of small stays, between the locking member and the hub seat remain unbroken.

14 Claims, 5 Drawing Sheets

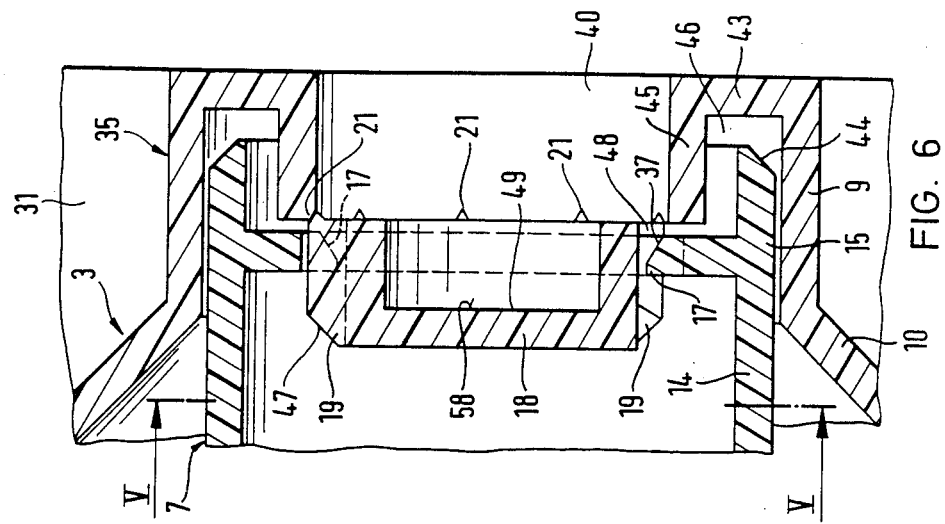
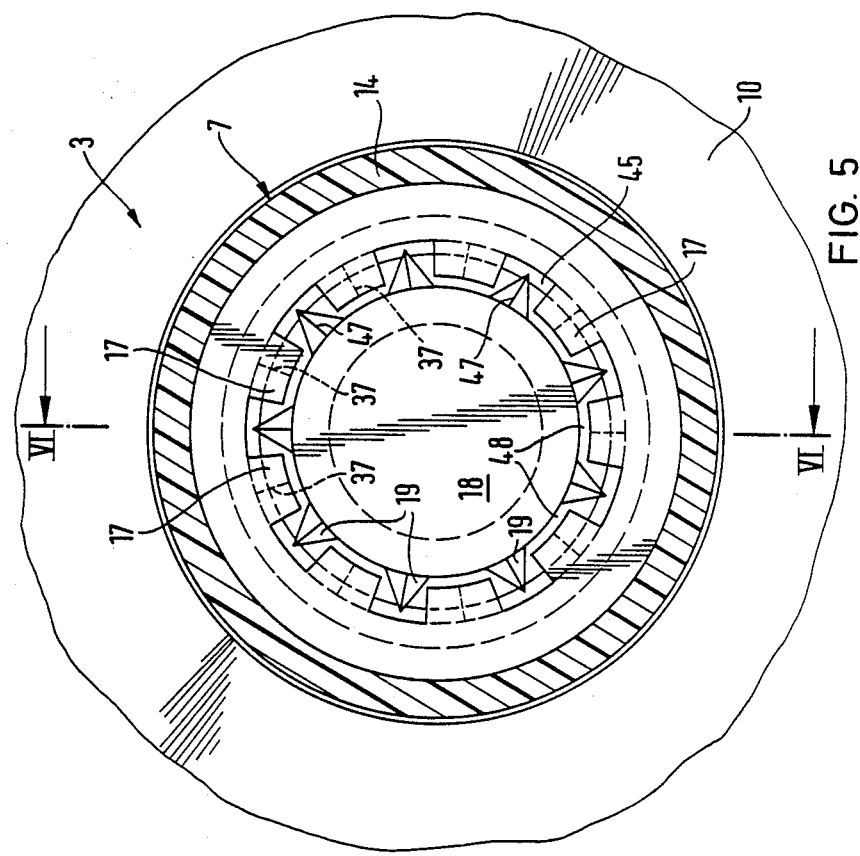
FIG. 6
FIG. 5

ROOM-LIGHT LOAD CASSETTE

BACKGROUND OF THE INVENTION

This invention relates to improvements in cassettes of the room-light load type, and in particular of the core lock known to be used in such cassettes. Such cassettes contain a web of photographic material, being wound up in a roll borne on a reel core having a longitudinal axis. The core comprises core hubs at opposite ends of the core, and being borne between two hub seats provided in opposite cassette end caps; such cassettes are known which comprise a breakable core lock adapted, while in unbroken condition, for locking at least one of the two opposite core hubs against rotation in the corresponding hub seat therefor. Of course, locking one hub against rotation in its seat means automatically locking also the other hub, unless the rotating force applied is strong enough to break the core lock. A known cassette of this type further comprises conventionally a casing having a light-tightly sealed web exit slot, so that, when the core lock is broken at a desired breaking site provided therein, the core hubs and together therewith the core and the roll of photographic material thereon can be easily rotated in their hub seats and a desired length of the web of photographic material can be unwound from the roll and can be exited through the cassette slot.

The term "room light" is understood to include daylight as well as artificial lighting.

A day light cassette having the above described features has been described in European patent application No. 0 053 856 and comprises cassette end caps containing hub parts which protrude into the two ends of the roll-bearing core and are firmly joined to its internal side. In the interior of the reel core there is clamped in a flat closure part which extends along a central longitudinal plane and is connected with a flat head part by means of a narrow connecting part which is to serve as a desired breaking zone. When assembling the known cassette, the head part is inserted in a slot which is located in a wall section of the hub part. When, after conveying and handling the known daylight cassette, the photographic material is to be exited therefrom, it must be pulled out of the cassette with an initial pulling force of about 30 Newtons.

This subjects the photographic material to considerable stress and may easily damage the same. When assembling the known daylight cassette, an exact orientation of the reel core containing the set-in flat closure element is required to correspond with the location of the above-mentioned slot so that the head part of the closure element will be located exactly opposite that slot when the various parts are being put together.

In an article in "Research Disclosure", volume 4244, Nr. 163 of November 1977, there is described under No. 16352 on page 43 a core locking device having a radially displaceable core locking member which engages, when in advanced position, a groove or slot of a web-winding core and prevents the core from rotating. In order to free the core lock, the locking member of the locking device, which comprises a considerable number of parts, must be displaced radially outwardly. This does indeed avoid subjecting the photographic material to stresses when changing to the free position; however, the known locking device requires numerous parts whose manufacture is complicated and which are difficult to assemble.

In U.S. Pat. No. 3,613,880 to Perrin there is described a dispenser containing a roll of strip material such as paper toweling wound up on a rotatable core. At one end the core bears a trunnion having a disk flange with triangular teeth projecting axially from the disk face turned away from the core. These teeth penetrate into a wall of the carton containing the paper roll for shipping, in order to prevent shifting of the roll in the carton. After shipping, a roll is taken out of the carton and placed in a dispenser having a rotatable disk-shaped support member. The trunnion end is rotatably locked with the support member by axially inserting the trunnion teeth into matching gaps between teeth, of trapezoidal cross section, in the periphery of the support member. The arrangement of the trunnion and support member does, however, not serve as a core lock, and could not be used as such, for a core bearing a roll of light-sensitive photographic material as the latter must, of course, not be removed from the cassette containing the same. The support member rotates freely.

Cassette end caps of reduced wall thickness and having various projecting areas and recesses for guiding a cassette hull during assembly with the end caps have been described in European patent application No. 0 016 488.

Finally, in U.S. Pat. No. 4,272,035 to Sherman et al, there is described a room-tight load cassette for light-sensitive strip material having a dispensing slot which is sealed to be light-tight by a layer of plush adhering to a profiled bar which is inserted into a slitted portion of the cassette wall and contacts a similar strip of plush on the opposite cassette wall adjacent the slot. No core lock is provided.

OBJECTS AND SUMMARY OF THE INVENTION

It is an object of the invention to provide a room-light load cassette of the initially described type which is improved by a novel core lock which is simple to manufacture and easy to assemble and which can be unlocked to allow for rotation of the core bearing a roll of photographic unexposed material in the cassette and dispensing of portions of the material therefrom.

It is yet another object of the invention to provide a novel core lock in a room-light load cassette, which satisfied the foregoing object and moreover facilitates the assembly of the entire cassette.

These objects and others that will become apparent from the following description of the invention are attained in a room-light load cassette of the initially described type which is improved by the core lock in the cassette comprising a breakable locking member and a sleeve part associated therewith, which locking member is preferably a locking cup and engages at least one of the initially mentioned core hubs and corresponding hub seats by way, and with the aid of the said sleeve part, while the core lock is in unbroken condition, thereby locking the respective core hub and hub seat against rotation relative to each other, each of the locking member and sleeve part having longitudinal axes extending parallel with each other and preferably with the longitudinal axis of the core, and being displaceable relative to each other by a short distance, but being locked against rotation relative to each other, about their respective longitudinal axes, as long as the core lock remains unbroken; the core lock further comprises connecting means, preferably in the form of thin, short stays, which are breakable in a desired breaking zone, and connect the locking cup or the like locking member with one of the two core supporting parts, either the core hub or the hub seat, while the sleeve part is permanently connected to the other one of these core-supporting parts, and the locking member as well as the sleeve part each comprise engagement means for mutually locking each other against rotation.

The engagement means are preferably adapted to provide frictional engagement between the locking member and the sleeve part; they are preferably an internal gear mounted in the sleeve part and an external gear provided on a suitable face of the locking cup or the like locking member.

In a preferred embodiment of the cassette comprising the novel core lock, the reel core has two open ends and each of the core hubs comprises a flat disk part bearing the sleeve part, the latter being of smaller diameter than the disk part and being mounted on the disk part to project therefrom on the disk face away from the core, while an annular flange is mounted peripherally on the disk part and projects axially from the latter into the adjacent open core end in which the annular disk part flange of the core hub is firmly mounted for joint rotation therewith.

In the above-described preferred embodiment of an improved cassette according to the invention, each of the cassette caps bears one of the two hub seats and each hub seat comprises a collar part extending in the direction of the longitudinal axis of the locking member and comprising an external wall part, an internal cylindrical tubular part and a bottom part closing the end of the collar part turned away from the core, thereby forming an axially extending annular groove which opens in a direction toward the core; this annular groove is concentrical with the longitudinal axis of the sleeve part and is adapted for receiving a free end of the sleeve part therein. In this preferred embodiment, the connecting means comprise a plurality of stays which are breakable connected with the locking member, in particular with the locking cup, on the one hand, and with the internal tubular part of the hub seat collar part, on the other hand. The stays are preferably easily broken by a force corresponding to a pull on the leading edge of the web on the roll, which pull is strong enough to unwind a part of the web and causing that web part to exit from the web exit slot of the cassette A particular preferred embodiment having the above-described features further contains the above-mentioned internal gear, while the locking cup or the like locking member has a circumferential sidewall which bears the external gear; preferably the latter has external gear teeth protruding from the aforesaid locking cup sidewall and extending in the direction of the longitudinal sleeve part axis, each tooth having an outward end face, i.e. facing away from the core, and an inward end face, i.e. facing toward the core, and each of the stays is connected with the outward end face of a different one of these external gear teeth. The inward face of each external gear tooth can be beveled in axial as well as in radial direction relative to the longitudinal locking cup axis, and preferably is designed with a sharp edge.

The internal gear in the sleeve part comprises a plurality of teeth each of which extends in the direction of the longitudinal sleeve part axis and preferably has, in a radial plane, a cross section of trapezoidal shape which is gradually reduced in size in the direction away from the core, whereby the gaps between the internal gear teeth are gradually enlarged in outward direction.

To summarize again the features of the preferred embodiment of the improved cassette according to the invention, the sleeve part is preferably molded integral with one of the core hubs which are mounted in the core for rotation therewith, and the locking cup or the like locking member is molded integrally with the hub seat of a cassette end cap. In order to achieve an engagement preventing rotation of one part relative to the other, the sleeve part is provided with an internal gear and the locking member with an external gear. The two core hubs have peripheral flanges which are press-seated in the open ends of the core which is designed as a hollow cylinder. The sleeve part has a diameter which is smaller than the internal width of the hollow core, and is molded integrally and concentrically with that face of a disk part of the core hub which faces away from the core. The cassette end caps comprise each a hub seat forming a recess on the side of the end cap turned away from the core which possesses a funnel-shaped zone of an internal diameter which gradually decreases to one which is only slightly larger than the external diameter of the sleeve part. Adjacent the funnel-shaped zone, in outward axial direction, the hub collar part comprises a hollow cylindrical wall part ending in a transverse annular bottom part from which an inner tubular part projects toward the core. An axially extending annular groove is thus formed in the collar part with the cylindrical wall part as external groove wall and the tubular as internal groove wall, and the bottom part closing the outward end of the groove while the opposite end of the groove opens toward the core.

While the above-mentioned stays have their one end molded integrally with the locking member or cup, the other end of the stays is molded integrally with the aforesaid tubular part of the seat collar. Rupture of these stays will the, separate the locking member from the tubular part so that it can fall into the interior of the core, thus freeing the engaging means of the internal sleeve part gear and enabling rotation of the collar together with its hubs in the hub seats of the cassette end caps.

When the locking member is manufactured without the external gear it can be used to obturate in a light-tight manner the central opening in the opposite cassette end cap without core lock, in lieu of a transverse wall which could be provided in the hub sleeve part for the same purpose. The only difference between the cassette end cap equipped with the core lock and the opposite end cap without core lock would hence reside in the locking member in the former end cap bearing a circumferential external gear, while the other end cap would comprise the same locking member but without the external gear.

The functional elements required in the core lock according to the invention can thus be molded integrally with the core hubs and the cassette end caps without requiring the manufacture of any separate, loose parts requiring separate molds and special steps of assembly In order to remove the core lock and set free the core for rotation, it is only necessary to press or push the locking member provided with an external gear into the interior of the cassette as described hereinbefore.

When the locking member without external gear is mistakenly pushed into the interior of the core, this will, naturally fail to free the core lock and the user will then have to push in the locking member in the opposite cassette end cap. Of course, a core lock could also be provided in each of the two end caps, although a single core lock, in only one of the cassette end caps, should normally suffice.

BRIEF DESCRIPTION OF THE DRAWINGS

Further objects and advantages of the invention will become apparent from the following detailed description thereof in connection with the accompanying drawings in which they represent.

FIG. 6 is an axial sectional view, on an enlarged scale, of the core-locking device in the cassette frontal end shown at the right in FIG. 2.

DETAILED DESCRIPTION OF THE EMBODIMENTS SHOWN IN THE DRAWINGS

Figure 1:
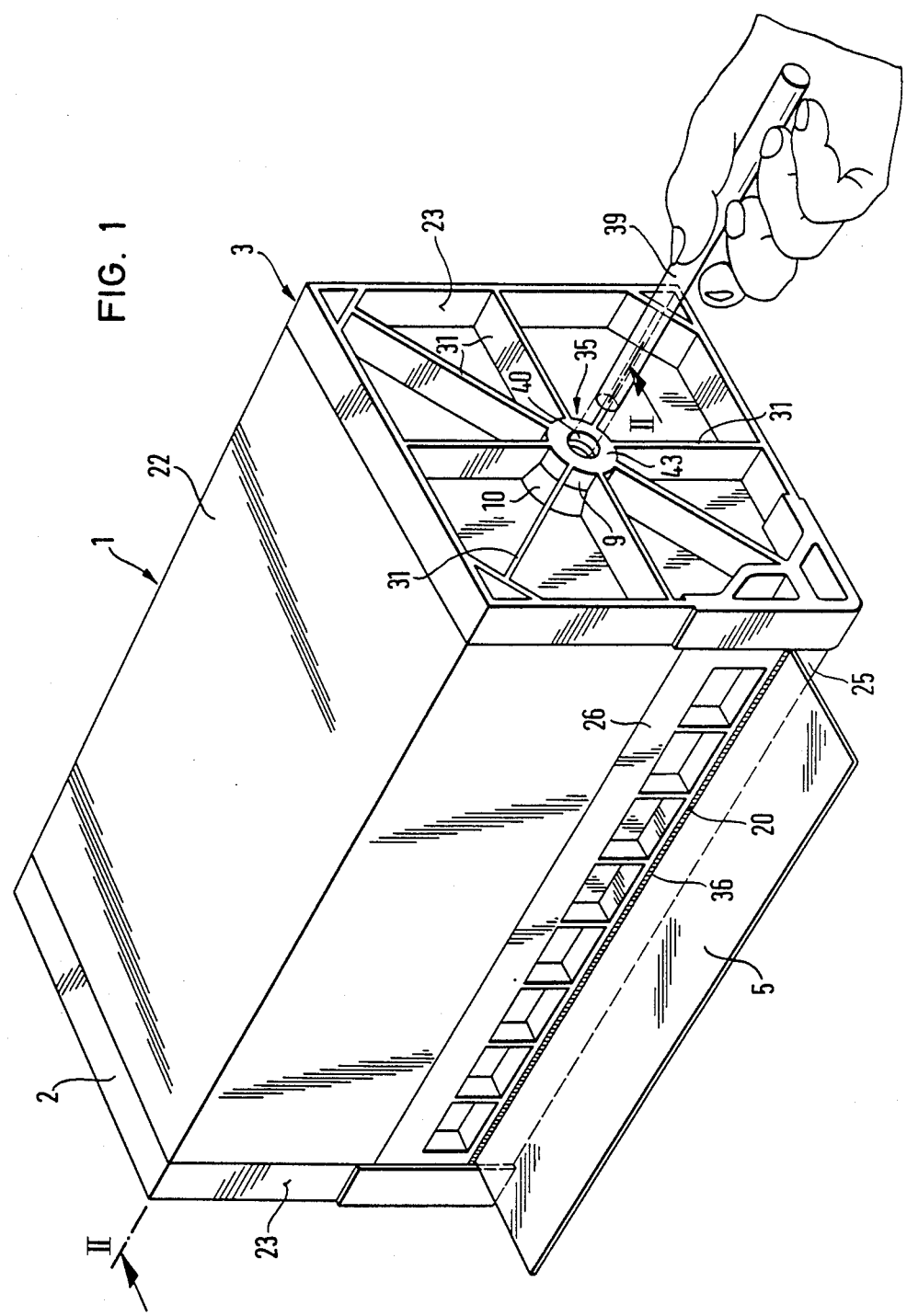
FIG. 1 a preferred embodiment of the roomlight-load cassette according to the invention in perspective view, FIG. 2 a longitudinal sectional view of the embodiment shown in FIG. 1, FIG. 3 a top view of a frontal end of the embodiment shown in FIGS. 1 and 2, partially shown in cross sectional view taken along a plane indicated by III—III in FIG. 2, FIG. 4 a partial, axially sectional view of an embodiment of the roomlight-load cassette similar to that shown in FIG. 2, but with a slightly modified hub-bearing seat without rotation locking member, and of the support flange provided with special guiding ribs, FIG. 5 a cross-sectional view through the rotation locking device in the cassette frontal end wall being the right hand one in FIG. 2, such view being taken in a plane indicated by V—V in the following FIG. 6.

The roomlight-load cassette shown in perspective view in FIG. 1 comprises a housing 1 of rectangular parallelepiped configuration provided with a left-hand square cassette end cap 2 and a right-hand square cassette end cap 3 made of impact-resistant polystyrene, as well as rectangular sidewalls forming a hull 22, made of cardboard and extending between the cassette end caps 2 and 3. In the hull 22, there is provided a longitudinal web passageway or slot 36 which extends in a sidewall between two profile members 25 and 26 being parts of that sidewall and providing a light seal for the slot 36. For this purpose, the profile members 25,26 bear on their faces turned toward one another, velvet strips 20 whose piles prevent roomlight from penetrating into the housing 1 while permitting a web, e.g. a film strip 5 of photographic material being wound up as a roll 34 on a reel core 4 to leave the housing 1 by way of the slot 36, whenever a core lock provided in the interior of the cassette is broken by pressing down a peg 39 into a central cap opening 40 in the cassette end cap 3.

Thereby it becomes possible to turn the reel core 4 (shown, e.g. in FIGS. 2 to 4) and unwind the roll 34 of photographic material web 5 wound up thereon, when pulling at the leading end portion of the strip 5 which is shown in FIG. 1 to protrude from the slot 36.

Figure 2:
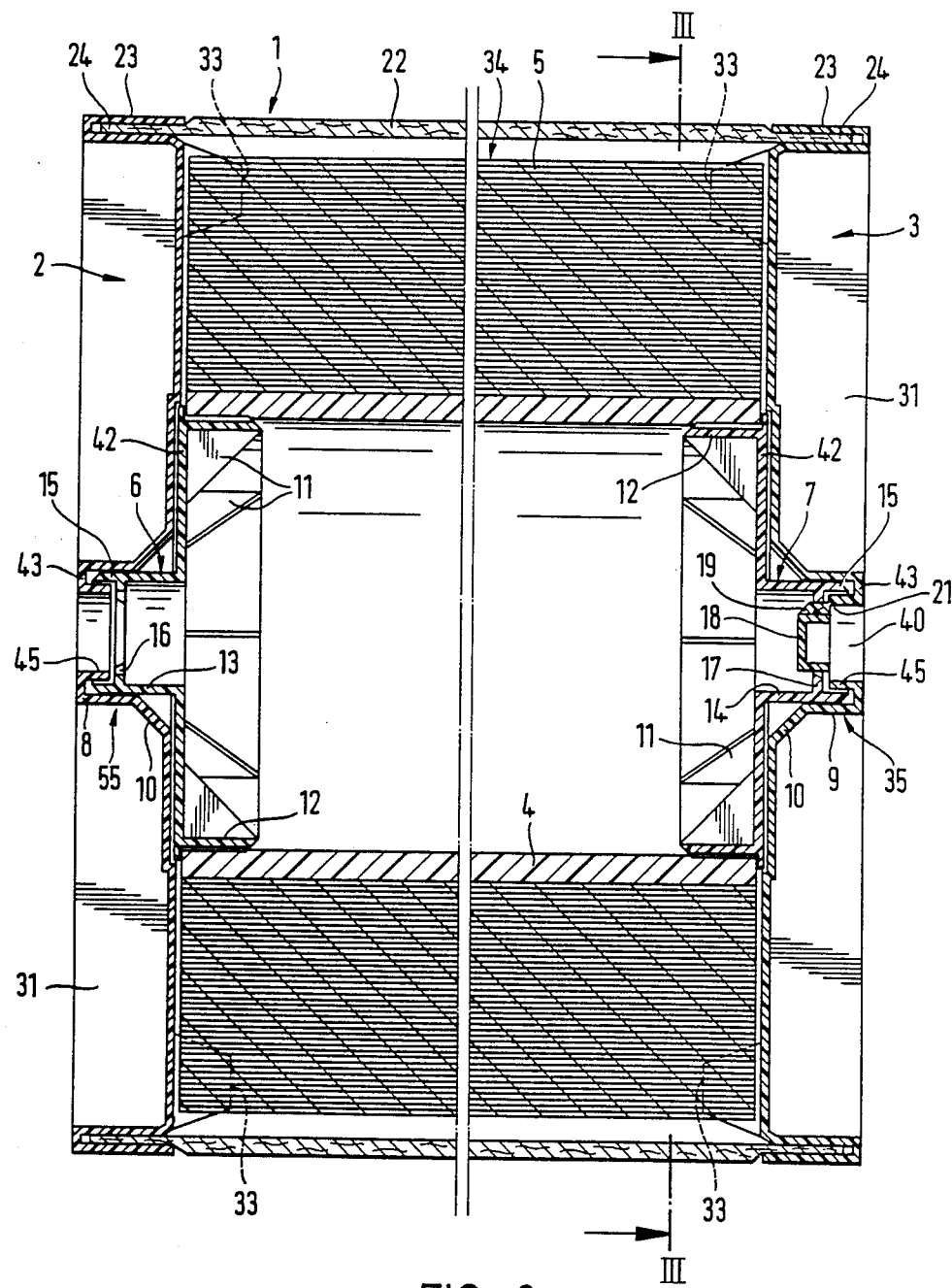

As can be seen from FIGS. 1 and 2, the cassette end caps 2 and 3 are made of relatively thin material and are therefore provided with a number of reinforcing ribs 31 which extend radially between a hub-bearing seat molded integral with the end caps 2, 3 and surrounding the cap opening 40, and a circumferential cap rim 23 which is clamped on to the peripheral margin 24 of the hull 22.

The hub seats 55 in the left-hand end cap 2 and 35 in the right-hand end cap 3 serve for supporting a left-hand core shaft end or hub 6 and a right-hand core shaft end or hub 7, respectively.

Each of these core hubs 6 and 7 has a flat disk part 42 bearing on the disk face which is turned outwardly, i.e. away from the web roll 34 on the core 4, a central recess in an outwardly protruding sleeve part 13 in the hub 6 and 14 in the hub 7, and, about the periphery of each disk part 42 a short inwardly projecting annular flange 12. This short annular flange 12 is fastened to the inside wall of the core 4, e.g., by being pressure-seated therein, for rotation therewith. Each of these annular flanges 12 is of larger diameter than the outwardly projecting sleeves 13 and 14 of the hubs 6 and 7, respectively. The hub sleeves 13 and 14 project into and are rotatably supported in annular grooves 46 of the hub bearings or seats 55 and 35, respectively, which seats are integral with the frontal wall of the cassette end caps 2 and 3 respectively, as shown in detail in FIGS. 2 and 6.

Each of the hub bearing seats 35 and 55 comprises, projecting in the direction away from the core 4, a funnel-shaped foot part 10 merged outwardly with a hollow cylindrical sleeve portion, 8 in the case of end cap 2 and 9 in the case of end cap 3, respectively, each of these sleeve portions merging in outward direction with an outwardly protruding collar part of basically U-shaped cross section and enclosing the groove 46, with an annular end wall of the collar part constituting the groove bottom wall 43 in each of the seats 35 and 55, and a radially inwardly situated groove wall, which is constituted by a socket part or tubular 45, projecting inwardly from the bottom wall 43, which tubulure 45 surrounds the central cap wall opening 40. The funnel-shape of the foot part 10 facilitates insertion of the hub sleeves 13 and 14 of the hubs 6 and 7, respectively into the corresponding hub seats, providing a centering guidance when the room-light load cassette according to the invention is being assembled. A transverse wall comprising an annular gear 16 provided in the hub sleeve 13 prevents deeper penetration of the latter into the hub seat 55, unless the stop is already provided by the flat disk part 42 of the hub 6 coming earlier to rest against the inside wall of the end cap 2.

The internal wall surfaces of the cylindrical sleeve portions 8 and 9 on the foot parts of hub seats 55 and 35, respectively, serve as sliding bearings for the axially extending wall surfaces of the hub sleeves 13 and 14, respectively. As can be seen especially in FIG. 6, the outward ends 15 of the hub sleeves 13, 14 which are beveled to terminate each in a sharpened rim 44, project outwardly up to a short distance from the bottom walls 43 of the grooves 46 in each of the collar parts of the hub seats 35 and 55. Thereby, the groove bottom wall 43 will not be contacted by the outward hub sleeve ends 15 projecting into the annular grooves 46 when the flat disk part 42 of either the hub 6 or the hub 7 comes to abut against the inside face of the respective end cap 2 or 3.

The design of the hub-bearing seat 35 of the end cap 3 fully corresponds to that of the hub-bearing seat 55 provided in the end cap 2 at the left-hand side in FIG. 2, except that the hub seat 35 and associated hub 7 shown at the right-hand side of FIG. 2 and more in detail in FIGS. 5 and 6, further comprises, in lieu of the annular gear 16 of the hub 6 a core lock which prevents rotation of the roll-bearing core in the cassette during storage and shipping, prior to the use of the web 5, e.g. the unexposed photographic film by a customer.

This core lock comprises a cup-shaped locking element 18 being molded integrally with the hub-bearing seat 35, and preferably with the entire end cap 3. The element 18 is of smaller diameter than the internal width of the tubulure 45 and consequently of the central cap opening 40, and is arranged concentrically with the latter. This locking cup 18 bears on its circumferential sidewall several teeth 19 of triangular cross sectional area which are shown in front view in FIG. 5 and one of which is visible in FIG. 6. The triangular ends of these teeth 19 which extend in axially inward direction, i.e. away from the tubulure 45 are beveled radially outwardly from the sidewall of the locking cup 18, and moreover narrowed in inward, axial direction in their beveled regions so as to form sharpened, inclined cutting edges 47 (FIG. 5,6). At their opposite triangular end faces the teeth 19 are connected via small connecting stays which define a desired breaking zone, with the tubulure 45, which thus bears the locking cup 18, leaving open between the stays 21 passages 48 whose width corresponds approximately to the distance of adjacent teeth 19 from each other The hub sleeves 13 and 14 bear on their respective radially inwardly facing cylindrical wall surfaces each a radially inwardly projecting annular gear comprising gear teeth 17 of trapezoidal section, taken in a plane radial to the core axis However, in the hub sleeve 13, the annular gear 16 is preferably only provided to simplify manufacture of the core hubs as uniform molded pieces, while the gear 16 remains without operative effect, as a locking cup with counter teeth 19 can be omitted at this end of the cassette, provision thereof at the other end being normally sufficient.

As can be seen from FIGS. 5 and 6, the trapezoidal teeth 17 of the annular gear in the hub sleeve 14 project in radially inward direction into the gaps between the triangular teeth 19, whereby the hub sleeve 14 can only be turned by a small angle, depending on the amount of play provided between the teeth 17 and 19, relative to the locking cup 18, as long as the roll 34 on the core 4 has been inserted into the cassette and only the leading edge of the web 5 protrudes from the slot 36. Only when, after a strong pull is exerted on the leading edge of the photographic material web 5, or after a peg 39 has been pressed into the opening 40, the connecting stays 21 have broken apart and the locking cup 18 has dropped into the interior of the hub sleeve 14, the sleeves 13 and 14 together with the hubs 6 and 7 of which they are, respectively, integral parts, can be turned easily in the corresponding hub-bearing seats 55 and 35, and a desired portion of the web 5 of photographic material can be unwound from the roll 34 thereof on the core 4 and pulled out of the cassette slot 36. When a peg or mandrel 39 is used for removing the core lock, it is inserted into the end cap opening 40 which has a wider internal diameter than the peg 39, and is pushed with sufficient force against the external face 58 of the disk-shaped bottom wall 49 of the locking cup 18 to break off the stays 21, In order to facilitate the insertion of the core hub 7 into the hub-bearing seat 35 comprising the locking cup 18 when assembling the room-light load cassette according to the invention, the two lateral flanks of the trapezoidal teeth 17 which may come into contact with the lateral flanks of the teeth 19, are inclined in outwardly converging directions away from the reel core 4, thereby being in axial outward direction of gradually diminishing size of their cross sectional area,(recognizable in FIG. 6, and indicated by dashed lines in FIG. 5) thereby gradually enlarging the gaps between the internal gear teeth in outward direction.

When the hub 7 is introduced into the hub seat 35 of the right-hand end cap 3, the inclined flanks of the teeth 17, which flanks extend obliquely relative to the longitudinal core axis, will cause a slight rotary displacement of the teeth 19, should the sharpened edges 47 abut the teeth 17, whereby the teeth 19 are guided into the gaps between the teeth 17, and the flat disk part 42 of the hub 7 can abut against the inside surface of the end cap 3. When this has occurred, the outward end faces of the teeth 17 will be at a short distance, recognizable in FIG. 6, from the axially inwardly directed frontal rim face of the inner wall or seat tubulure 45 of the collar part of the hub seat 35. As the annular gear having teeth 17 is spaced a short distance inwardly in the hub sleeve 14 away from the beveled external rim 44 of the sleeve end 15, the latter can protrude into the annular groove 46 in the hub seat collar part comprising bottom wall 43.

An annular gap, shown in FIG. 6, between the external wall surface of the hub sleeve 14 and the internal wall surface of the cylindrical sleeve portion 9 of the hub seat 35 enables a small radial play between the core hub and the hub seat. A small axial play is likewise provided between the aforesaid two parts by making the axial distance between the outwardly directed faces of the flat disk parts 42 of the core hubs 6 and 7 slightly smaller than the axial distance between the inwardly directed surfaces of the end caps 2 and 3.

Figure 3:
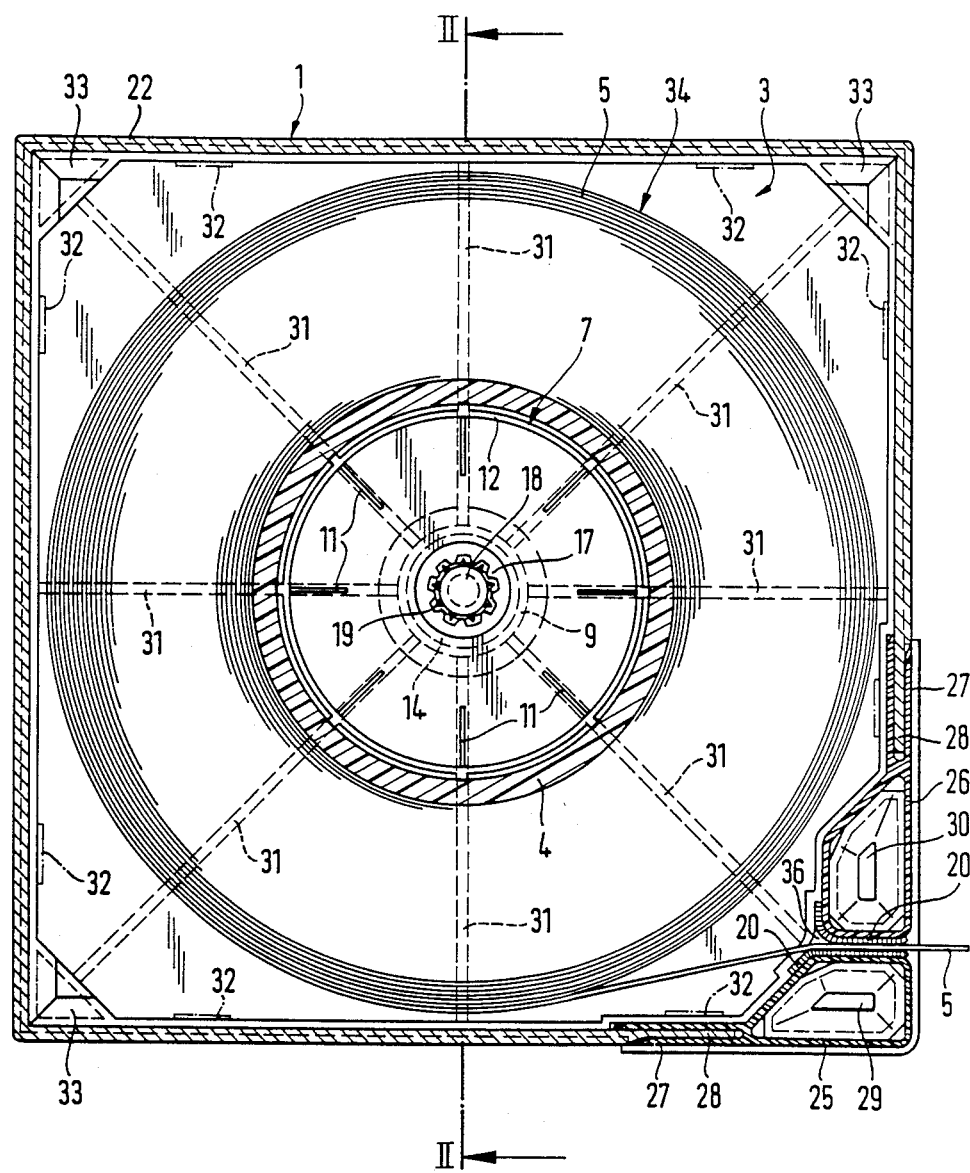

In FIGS. 2 and 3, there are shown in the corners between the flat disk parts 42 and their annular flanges 12, triangular ribs 11 which stiffen the core hubs 6 and 7. In a different embodiment shown in FIG. 4, similar stiffening ribs 53 have enlarged side faces, and have guiding edges 50 beginning at the inward rim of the annular flange 12, projecting slantedly inwardly, thereby facilitating the assembly of the core hubs 5 and 6 with the core 4 in a manner known per se. For the same reason, the inwardly facing rim 51 of the annular flange 12 is beveled.

Figure 4:
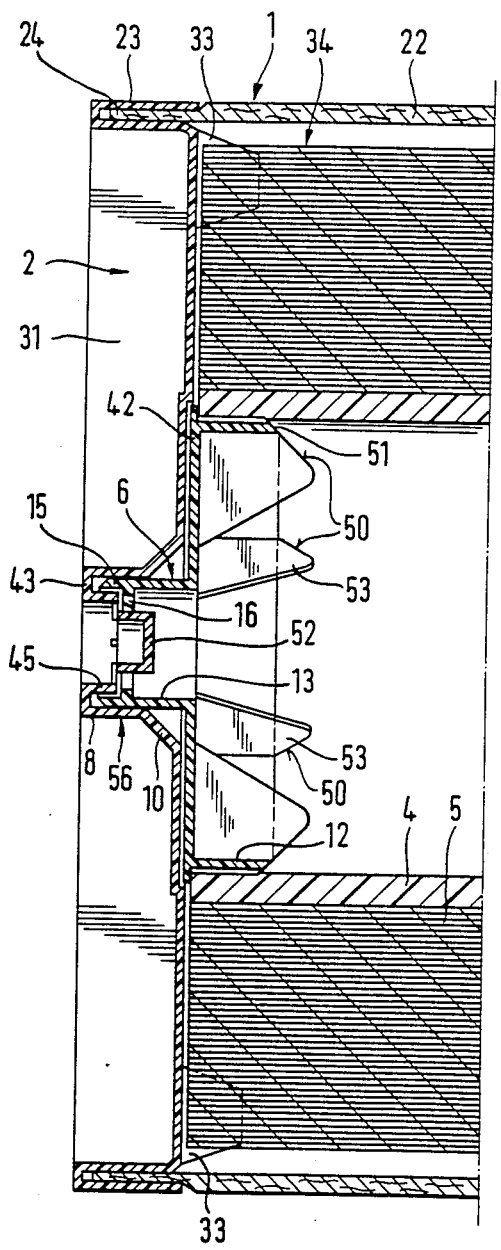

In FIG. 4 there is also shown a slightly varied embodiment of the hub-bearing seat 55; it deviates somewhat from the embodiment thereof shown on the left-hand side in FIG. 2, by that it also comprises a locking cup 52 molded integrally with the seat tubulure 45 of the hub seat 56, as is the locking cup 18, but bearing no teeth 19, in contrast to the last-mentioned locking cup. This affords manufacture of identical core hubs 6 and 7 and almost identical hub seats 35 and 56, thereby simplifying the manufacture of the roomlight load cassette according to the invention.

FIG. 3 is a cross-sectional view of the cassette shown in longitudinal section in FIG. 2, and offers a top view of the inward aspect of the core hub 7 as shown in FIG. 2, but with the hub-bearing seat 35 being omitted. The flat disk part 42, the peripheral annular flange 12 and the inward end of the hub sleeve 14 merging with the disk part 42, as well as the annular gear with trapezoidal teeth 17, all pertaining to the core hub 7, are easily recognized. Teeth 19 of the locking cup which are to engage the gaps between the teeth 17 are shown enlarged in FIG. 5.

In FIG. 3 there are shown in cross-sectional view the profile members 25, 26 being part of a sidewall of the cassette as shown in FIG. 1. These profile members 25 and 26 are provided with slitted marginal zones into which the longitudinal margins 28 of the sidewalls of the cassette hull 22 can be inserted and fastened therein in a conventional manner. The profile members 25 and 26 can be snapped into place in the cassette sidewalls with the aid of pyramidal holding projections 29 and 30 which are provided, e.g. by being molded integral therewith, on the inside faces of the square cassette end caps 2 and 3, and can snap into corresponding recesses at opposite ends of the profile members. FIG. 3 also illustrates the path of the web 5 of photographic material between the piles of the velvet strips 20 which seal the slot 36 between the profile members 25 and 26 light-tight at all times, also while the web 5 is passed therethrough.

The reinforcing ribs 31 of the end cap 3 which are shown in FIG. 1 are also indicated in FIG. 3 by dashed lines.

When assembling the room-light load cassette according to the invention, the two profile members 25, 26 are fitted with their slit portions on the longitudinal rims 28 of the cardboard blank of the hull 22 under room light. These joined parts are then conveyed to a dark room in which the core 4 bearing the roll 34 of photographic material web 5 and core hubs, 6,7 are inserted in the joined set of parts 22, 25 and 26, and the core hubs are firmly attached to the core ends. The two cassette end caps 2 and 3 are then caused to receive the peripheral margins 24, simultaneously inserting the core hub sleeves 13 and 14 in the corresponding grooves 46 of the hub seats 35 and 55. Subsequently, the end caps 2 and 3 are permanently connected by welding them on to the hull 22 at welding spots 32. In order to facilitate the assembly, centering profile elements 33 are provided at three corners of each of the cassette end caps 2 and 3 and form slanted guiding faces.

We claim:

1. In a cassette of the room-light load type, comprising a casing having a light-tightly sealed web exit slot, and end caps at opposite ends, which cassette contains a web of photographic material being wound up in a roll borne on a reel core having a longitudinal axis and comprising core hubs at opposite ends thereof, which core is rotatably supported in two hub seats provided in said opposite end caps, said respective core hubs and corresponding hub seats being designated as first and second core supporting parts; and a breakable core lock adapted, while in unbroken condition, for locking at least one of the two first core supporting parts against rotation relative to the second core supporting part therefor, so that, when the core lock is broken at a desired breaking site provided therein, the first core supporting part can rotate relative to the second core supporting part and together therewith the core and the roll of photographic material thereon can be easily rotated, whereby a desired length of the web of photographic material can be unwound from the roll and can be exited through the cassette slot, the improvement of said core lock comprising a locking member and a sleeve part associated therewith, which locking member locks said first core supporting parts against rotation relative to said corresponding second core supporting parts by engaging said sleeve part while the core lock is in unbroken condition, said locking member and sleeve part having longitudinal axes and being axially displaceable relative to each other by a short distance, but being locked against rotation relative to each other, about their respective longitudinal axes; said core lock further comprising connecting means being breakable in a desired breaking zone, and connecting the locking member with the first core-supporting part, while the sleeve part is permanently connected to the second core-supporting part.

2. The improvement of claim 1, wherein said sleeve part comprises an internal gear and said locking member is a locking cup which comprises an external gear adapted for engagement with said internal gear, while said core lock is unbroken.

3. The improvement of claim 1, wherein said sleeve part is integrally molded with said core hub and said connecting means are integrally molded with a locking cup as said locking member on the one hand, and with said hub seat, on the other hand.

4. The improvement of claim 2, wherein said reel core has two open ends and each of said core hubs comprises a flat disk part bearing said sleeve part, said sleeve part being of smaller diameter than said disk part and being mounted thereon projecting therefrom away from said core, and an annular flange mounted peripherally about said disk part and projecting axially therefrom into an adjacent core end and being firmly mounted therein for joint rotation therewith.

5. The improvement of claim 4, wherein each of said cassette end caps bear one of said hub seats and each of said hub seats comprises a collar part extending in the direction of a longitudinal axis of said locking cup as said locking member and being adapted for receiving a free end of said sleeve part therein; said connecting means comprising a plurality of stays being breakably connected with said locking cup, on the one hand, and with one hub seat collar part on the other hand.

6. The improvement of claim 5, wherein said collar part comprises an external wall part, an internal cylindrical tubular part and a bottom part closing the end of said collar part turned away from said core, thereby forming an axially extending annular groove therein opening in a direction toward said core and being concentrical with said longitudinal axis of said sleeve part, and said stays are connected with said internal tubular part of said collar part.

7. The improvement of claim 5, wherein said stays are easily breakable by a force corresponding to a pull on said web wound up on said roll, strong enough for unwinding a part thereof and causing the unwound web part to exit from said slot.

8. The improvement of claim 5, wherein said sleeve part comprises an internal gear and said locking cup has a circumferential sidewall and comprises an external gear adapted for engaging said internal gear and having external gear teeth protruding from said locking cup sidewall, said external gear teeth extending in the direction of said longitudinal sleeve part axis and having each an outward end face turned away from said core, and an inward end face turned toward said core, each of said stays being connected with a different one of said outward tooth end faces of said external gear.

9. The improvement of claim 8, wherein the inward face of each external gear tooth is beveled in axial and in radial direction relative to said longitudinal locking cup axis.

10. The improvement of claim 9, wherein said internal gear comprises teeth, each tooth thereof extending in the direction of said longitudinal sleeve part axis and having a cross section gradually diminishing in size in the direction away from said core, thereby gradually enlarging the gaps between said internal gear teeth in outward direction away from said core.

11. The improvement of claim 9, wherein each tooth of said external gear is of triangular cross section, radially with regard to said longitudinal axis, and said inward end of each external gear tooth is designed in a manner such as to constitute a sharp edge, and each tooth of said internal gear has a trapezoidal cross section radially with regard to said longitudinal sleeve part axis.

12. The improvement of claim 1, wherein said sleeve part is integral with said core hub and comprises an internal gear integral therewith, and said locking member is integral with said hub seat and comprises an external gear adapted for engaging said internal gear to prevent rotation of said core hub in said hub seat, as long as said connecting means are unbroken.

13. The improvement of claim 12, wherein said connecting means comprise a plurality of stays integral with said locking member and said hub seat and being breakable in a desired rupture zone.

14. The improvement of claim 1, wherein said first core supporting part is the hub seat and said second core supporting part is the core hub, and wherein said locking member is a locking cup being breakably connected to said hub seat.

* * * * *